July 21, 1931. J. FAVATA, JR 1,815,195
HOLDER FOR FLOWER POTS AND CUT FLOWERS
Filed April 16, 1929
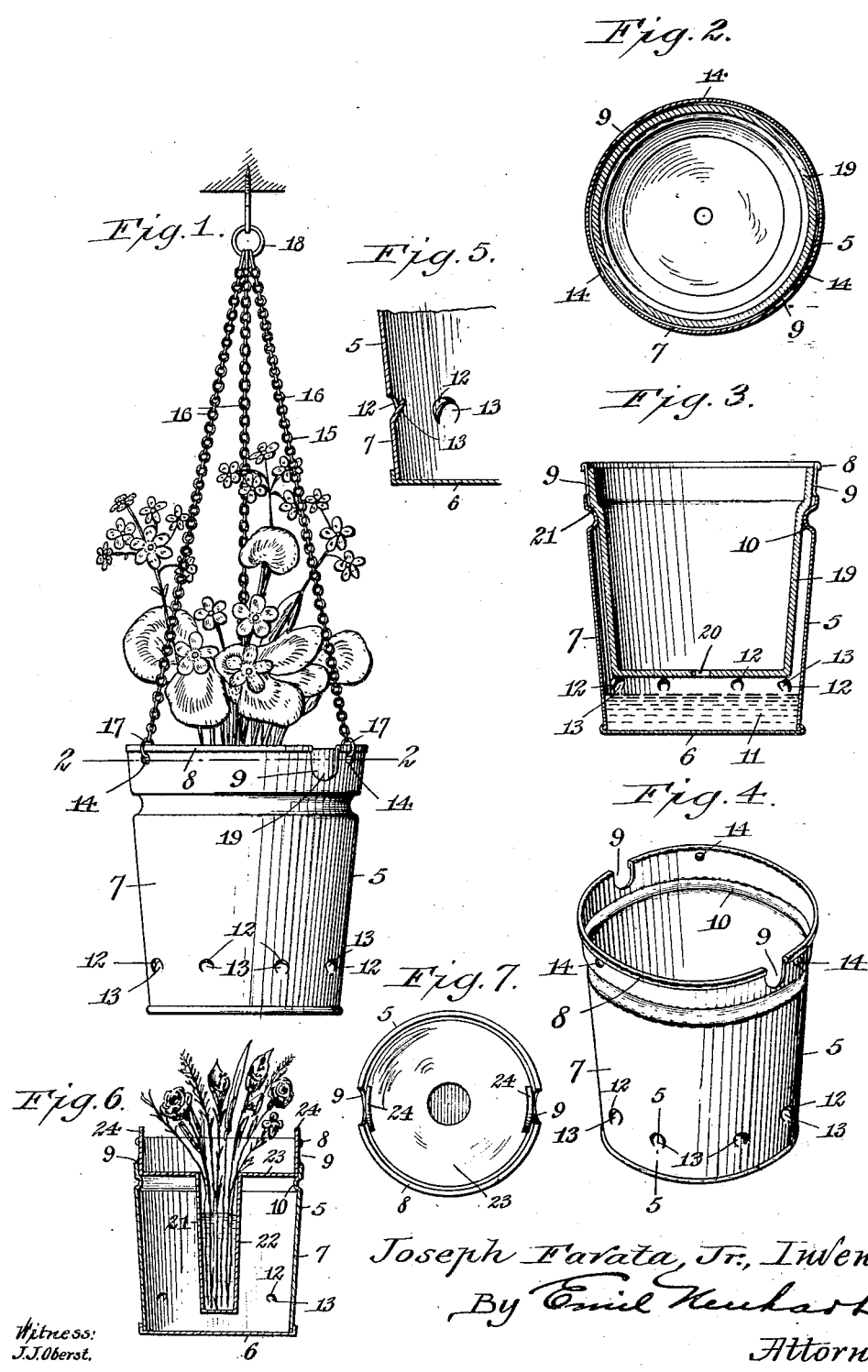
Joseph Favata, Jr., Inventor
By Emil Neuhart
Attorney.
Witness:
J.J.Oberst.

Patented July 21, 1931

1,815,195

UNITED STATES PATENT OFFICE

JOSEPH FAVATA, JR., OF BUFFALO, NEW YORK

HOLDER FOR FLOWER POTS AND CUT FLOWERS

Application filed April 16, 1929. Serial No. 355,503.

My invention relates to improvements in holders for flower pots and cut flowers, and more particularly to that type of holder which completely conceals the flower-pot or the container for cut flowers designed for use in connection therewith, and which may be attractively painted or otherwise colored, or have designs painted thereon or be otherwise embellished.

One of the objects of my invention is to provide a holder for flower pots and cut flowers which is simple and inexpensive, and which is so constructed that a flower-pot inserted therein, although wholly concealed except for two comparatively small areas, can be conveniently withdrawn from the holder.

Another object of my invention is the provision of a holder for flower pots and cut flowers so constructed that it can be easily suspended by a hanger secured to an elevated point, or be supported on a table, a stand or support, or in any other manner.

Another object of my invention is the provision of a holder of the kind mentioned, which is provided with means to properly support a flower pot in a substantially concealed manner, yet maintain the bottom of the flower-pot in spaced relation to the bottom of the holder; the holder being constructed to retain water up to a certain level.

A further object of my invention is the provision of a holder of the kind mentioned, which has its lower end water-tight and adapted to retain a quantity of water, and which is also provided above the water level with air inlets; the holder further having means to support a flower-pot therein with its bottom spaced from the water retained in the holder and in such relation that air may enter the holder through said air inlets directly above the water so as to draw moisture from the water before entering the usual opening in the bottom of a flower-pot; thus providing the necessary moisture and air to the roots of the plant within the flower-pot to assure best results for the plant.

A still further object of my invention is to provide a holder for plants which is adapted to receive a flower pot or flower vase, and which has means to support either said pot or vase, and embodies in its construction means to readily remove the flower pot or vase placed therein, as the case may be.

With the above and other objects to appear hereinafter, my invention consists in the novel construction and in the combination and relation of parts to be hereinafter described and more particularly pointed out in the subjoined claims.

In the drawings:—

Fig. 1 is a side elevation of my improved flower-pot holder having a flower-pot therein and being suspended from an elevated point by means of a hanger.

Fig. 2 is a transverse section, taken on line 2—2, Fig. 1; the flower pot shown in the holder being empty.

Fig. 3 is a central vertical section through the holder and an empty flower-pot inserted therein.

Fig. 4 is a perspective view of the flower-pot holder.

Fig. 5 is an enlarged vertical section through lower portion of the holder, taken on line 5—5, Fig. 4.

Fig. 6 is a central vertical section through the holder and a vase for holding cut flowers, particularly designed for use in said holder in substantially the same manner as a flower pot.

Fig. 7 is a plan view of the holder and the vase for flowers placed within the holder.

This improved holder comprises a container 5, which may have any cross-sectional formation, but is preferably circular and slightly tapered downwardly to conform to the conventional flower-pot, and it is open at its upper end and closed in a water-tight manner at its lower end by means of a bottom 6. This container may be formed of any suitable material, and the tapering circularly-formed sides or peripheral wall 7 and the bottom may be stamped in piece, or the bottom may be soldered or otherwise fastened to said peripheral wall.

The upper edge of the peripheral wall 7 is rebent upon itself to form a stiffening bead 8 so as to reinforce the holder, and with a view of enabling this bead to be formed more readily and in a neater and more finished manner than would otherwise be possible, the peripheral wall is provided with two notches 9 which extend from a plane beneath the stiffening bead to the upper edge of the peripheral wall. These notches are arranged at diametrically opposite points of the flower-pot holder. The upper edge of the peripheral wall 7 may therefore be said to have two separate and distinct stiffening beads, both extending from one of the notches 9 to the other. The rebending of the metal at the upper edge of the peripheral wall is more readily effected by separating the regions of the metal to be bent than would be possible by having an endless range or region of metal along which a continuous stiffening bead were formed. The notching of the upper portion of the peripheral wall, as stated, also has another advantage to appear hereinafter.

If desired, the stiffening bead at the upper edge of the peripheral wall may be bent or curved around a reinforcing wire, and the bending of the sheet material from which the holder is formed will also be more readily effected, due to the notches 9 dividing the upper marginal portion of the holder into two separated regions.

The peripheral wall of the holder or container is crimped inwardly circumferentially in a continuous manner a short distance from the upper edge thereof and in slightly spaced relation to the inner or lower ends of the notches 9, the crimp thus formed providing an interior supporting flange or bead 10. The holder is therefore provided with pot-supporting means without in any manner resorting to the use of externally-projecting parts; and the peripheral wall may consequently be said to be symmetrically tapered from top to bottom.

Within the holder or container, water, designated by the numeral 11, is to be placed and a circular series of air inlets 12 govern the amount of water to be placed within the holder or container. These air inlets are preferably in the form of small parti-circular openings formed in the peripheral wall above the largest quantity of water intended to be placed within the holder or container. These air inlets 12 are formed by cutting through the sheet material of the holder in a parti-circular course, and thence bending the sheet material where severed inwardly to form inwardly and upwardly inclined guard lips or ears 13. While openings of sufficient area are thus provided for free admission of the air, these guard lips serve to prevent the free discharge of water from the holder when shaking or slightly tilting the same during the act of moving the holder with a flower-pot therein, from one place to another. A series of opening 14 are formed in the peripheral wall 7 directly beneath the stiffening bead 8. These last-mentioned openings, preferably three forming the series, are spaced equi-distantly around the peripheral wall and are adapted to have parts of a hanger 15 passed therethrough. A hanger serving admirably for this purpose is one having three strands converging upwardly to a common point, and as an example of such a hanger I have illustrated three chains 16, to the lower ends of which rings or other suitable fastening elements 17 are secured which are passed through the openings 14 and bear against the walls of said openings at their highest points and also against the lower edges of the beads 8 at the upper edge of the container or holder; thus greatly strengthening the means of supporting the holder or container from an elevated point and preventing the metal at this point wearing through readily under the weight of the plant placed within the holder. The upper converged ends of the chains 16 are connected together with a large link or ring 18, which may be placed over a hook or otherwise attached.

19 designates a flower-pot illustrated in Figs. 1 and 3 as fully concealed, except at the regions exposed through the notches 9 at the upper edge of the holder or container. This flower-pot is shown in Fig. 1 as having a plant therein, necessarily being filled with soil to sustain the life of the plant, while in Fig. 3 the flower-pot is shown empty and has its bottom provided with the usual opening 20. Flower-pots of this type are slightly larger in diameter at their upper ends to form a downwardly-facing shoulder 21, which shoulder is adapted to be seated against the supporting flange or bead 10, formed on the interior of the peripheral wall 7 of the holder or container. This supporting flange or bead is so spaced with reference to the bottom of the holder or container that a flower-pot intended to fit into the latter will have its bottom spaced from the water within the holder or container, and preferably in a plane above the air inlets 12 in the peripheral wall 7. Air is therefore freely admitted into the holder or container through said air inlets and passes upwardly through the opening 20 in the bottom of the flower-pot, carrying with it the necessary moisture to keep the soil within the flower-pot properly dampened. Under this arrangement, the flower-pot does not extend into the water, as commonly provided for in flower-pot holders adapted to maintain the soil of a plant in moistened condition. A flower-pot having its lower end extending into water without the necessary supply of air tends to foul the plant and rot the roots thereof; all of which is avoided in my improved flower-pot holder.

It will be apparent that even though the upper edge of the flower-pot is in a plane beneath the upper edge of the holder or container, the flower-pot may be easily removed from the holder or container by grasping the same where exposed at the notches 9 in the peripheral wall 7. These notches permit the flower-pot to be inserted slowly and with ease into the holder so as to relieve the hanger of strain. The flower-pot can thus be properly seated against the supporting flange or bead 10 under full control, before releasing one's hold of the same.

In Figs. 6 and 7 I have shown a vase 21 held within the holder in substantially the same manner as the flower-pot, the vase having a hollow downwardly tapered chamber or receptacle 22 provided at its upper end with a comparatively large annular flange 23, which is seated against the supporting flange or bead 10 of the holder, and at its marginal portion this flange has two upstanding handles or ears 24, which are disposed in line with the notches 9 of the holder so that they may be easily taken hold of to remove the vase from the holder. The chamber or receptacle 22 of the vase may be supplied with water to any desired level, and the stems of cut flowers inserted thereinto. When placing the vase within the holder, it will be unnecessary to supply the latter with water.

Where, in the claims, reference is made to a flower receptacle, it shall be considered as meaning a flower-pot, a vase, or any other container in which flowers or flowering plants may be held.

Having thus described my invention, what I claim is:—

1. A holder for flowers having a symmetrically downwardly-tapered peripheral wall provided with a projection internally near its upper edge wholly within said symmetrically tapered wall, and a flower receptacle of smaller diameter than said holder having a downwardly-facing shoulder at its upper end adapted to rest upon said internal projection.

2. A holder for flowers having a symmetrically downwardly-tapered peripheral wall provided with an annular internal bead near its upper edge wholly within said symmetrically tapered wall, and a vase of comparatively small diameter having a comparatively wide outstanding flange, the marginal portion of which is seated against said internal bead.

3. A holder for flowers having an annular internal bead near its upper edge and notches at diametrically opposite points extending from the upper edge of the holder toward said annular bead, and a vase for cut flowers of smaller diameter than said holder and provided at its upper end with a comparatively wide annular flange having its marginal portion resting on said internal bead, said flange having upstanding ears at its marginal portion alined with the notches in said holder.

4. A flower-pot holder formed of sheet metal and having a water-tight bottom and means near its upper end to support a flower-pot with the bottom of the flower-pot in spaced relation to said bottom, and inwardly and upwardly inclined guard lips stamped from the sheet metal in a plane beneath the bottom of said flower-pot, the stamping of said guard lips forming air inlets within said holder.

In testimony whereof, I affix my signature.
JOSEPH FAVATA, Jr.